US010038811B2

(12) United States Patent  
Tanaka et al.

(10) Patent No.: US 10,038,811 B2  
(45) Date of Patent: Jul. 31, 2018

(54) IMAGE READING DEVICE AND IMAGE FORMING DEVICE

(71) Applicant: Konica Minolta, Inc., Chiyoda-ku, Tokyo (JP)

(72) Inventors: Masahiko Tanaka, Toyokawa (JP); Yuki Higuchi, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/275,053

(22) Filed: Sep. 23, 2016

(65) Prior Publication Data  
US 2017/0094094 A1    Mar. 30, 2017

(30) Foreign Application Priority Data  
Sep. 30, 2015 (JP) .................................. 2015-194662

(51) Int. Cl.  
  *H04N 1/04* (2006.01)  
  *H04N 1/10* (2006.01)  
  *H04N 1/028* (2006.01)

(52) U.S. Cl.  
  CPC ....... *H04N 1/1043* (2013.01); *H04N 1/02815* (2013.01); *H04N 1/1026* (2013.01); *H04N 1/1061* (2013.01); *H04N 2201/0081* (2013.01)

(58) Field of Classification Search  
  CPC ............. H04N 1/1043; H04N 1/02815; H04N 1/1026; H04N 1/1061; H04N 2201/0081  
  USPC ....... 358/497, 494, 474, 471, 483, 482, 514, 358/505  
  See application file for complete search history.

(56) References Cited

U.S. PATENT DOCUMENTS

| 6,717,702 | B1* | 4/2004 | Yamauchi | .......... H04N 1/00519 358/471 |
| 2001/0040705 | A1* | 11/2001 | Yokota | ................. H04N 1/0083 358/474 |
| 2002/0054387 | A1* | 5/2002 | Yokota | ............... H04N 1/02835 358/509 |

(Continued)

FOREIGN PATENT DOCUMENTS

| JP | 2001-230895 A | 8/2001 |
| JP | 2002-218161 A | 8/2002 |

(Continued)

OTHER PUBLICATIONS

Office Action (Notice of Reasons for Rejection) dated Nov. 28, 2017, by the Japanese Patent Office in corresponding Japanese Patent Application No. 2015-194662 and English translation of the Office Action. (14 pages).

*Primary Examiner* — Cheukfan Lee  
(74) *Attorney, Agent, or Firm* — Buchanan Ingersoll & Rooney PC

(57) ABSTRACT

An image reading device of the present invention includes a reading unit in which a lighting system and an optical system are mounted, a controller provided at a position where the controller does not transfer along with the reading unit, and a flexible flat cable that includes a curved portion and connects the reading unit with the controller. The lighting system includes an elongated light conductor extended in the main scanning direction and an end portion light source arranged at the end portion of the light conductor. The flexible flat cable is arranged on the outside of the optical system and on the lower side of the light conductor.

8 Claims, 4 Drawing Sheets

(56) References Cited

U.S. PATENT DOCUMENTS

| | | | |
|---|---|---|---|
| 2002/0171880 A1 | 11/2002 | Yui et al. | |
| 2010/0110159 A1 | 5/2010 | Kawamoto et al. | |
| 2011/0211234 A1* | 9/2011 | Kozaki | H04N 1/00559 358/474 |
| 2014/0043663 A1 | 2/2014 | Matsumoto | |
| 2014/0085688 A1* | 3/2014 | Kozaki | H04N 1/00907 358/482 |
| 2014/0160539 A1* | 6/2014 | Wei | H04N 1/00557 358/494 |
| 2014/0211280 A1 | 7/2014 | Yamasaki et al. | |
| 2017/0134613 A1* | 5/2017 | Matsubara | H04N 1/401 |

FOREIGN PATENT DOCUMENTS

| | | |
|---|---|---|
| JP | 2002-344703 A | 11/2002 |
| JP | 2010-107825 A | 5/2010 |
| JP | 2012-108424 A | 6/2012 |
| JP | 2014-036365 A | 2/2014 |
| JP | 2014-150312 A | 8/2014 |

* cited by examiner

IMAGE READING DEVICE AND IMAGE FORMING DEVICE

CROSS-REFERENCE TO RELATED INVENTION

The present application claims the benefit of patent application number 2015-194662 filed in Japan on Sep. 30, 2015, the subject matter of which is hereby incorporated herein by reference.

BACKGROUND OF THE INVENTION

Field of the Invention

The present invention relates to an image reading device that reads the image of a document and acquires image signals, and an image forming device, and more particularly, relates to an image reading device of a stationary reading type in which the image of a document statically placed is read with a reading unit that transfers in a sub-scanning direction, and an image forming device including the image reading device.

Description of Related Art

Conventional devices of this sort are exemplified by Japanese Unexamined Patent Application Publication No. 2001-230895 and Japanese Unexamined Patent Application Publication No. 2010-107825. As for the image reading device disclosed in Japanese Unexamined Patent Application Publication No. 2001-230895, an elongated reading unit extended in a main scanning direction is reciprocated in a sub-scanning direction, thereby reading images of a document. Herein, electric signals between the reading unit, which is a moving body, and a control unit fixed on an immovable case frame are interchanged with a flexible flat cable (hereinafter, also referred to as "FFC"). Also, a bending portion is provided in the FFC so as to cause the reading unit to smoothly transfer without buckling the FFC in the case in which the reading unit is reciprocated.

In Japanese Unexamined Patent Application Publication No. 2001-230895, an attempt is made to absorb excessive tension applied to the FFC by providing two bending portions so as not to apply the excessive tension to the FFC during transfer. Also, in Japanese Unexamined Patent Application Publication No. 2010-107825, the bending portion of the FFC is stored in a concave portion that is formed by digging down a chassis member on the bottom surface of the case frame, thereby alleviating bending stress applied to the bending portion of the FFC at a home position of the reading unit and reducing a repulsive force attributed to the bending of the FFC.

However, according to the invention disclosed by Japanese Unexamined Patent Application Publication No. 2001-230895, when the two bending portions of the FFC are constituted, curvature of each bending portion increases, which leads to an increase in the bending stress applied to the FFC and raises a possibility that the FFC is deteriorated or broken. In contrast, when curvature R is increased so as to reduce the bending stress, an increase in the size of the device is caused. Also, a gap between the reading unit being transferred and the FFC is narrowed in terms of constitution, so that there is a possibility that, when the FFC slightly floats, the FFC is entangled or caught.

In particular, in recent years, the use of illumination units, in which LEDs are employed as a scanner light source, has been increasing steadily. The efficiency of the light emission of LEDs has been improved year by year, and as for the lighting of a multifunction peripheral (MFP) scanner, an LED light conductor method in which a linear light source is formed with a few LEDs by use of an LED light conductor is being in the mainstream, in place of an array method in which a multitude of LEDs are arranged on an elongated substrate. Also, even when the sensitivity of a charge-coupled device (CCD) is enhanced, which leads to reduction in pixel size and the speeding up of a unit scan method in which the CCD and an optical system are integrated, a small-size unit can be constituted, so that the LED light conductor method tends to be adopted even in the MFP scanner that requires speeds.

However, in unit scanning of a high-speed device, the FFC of a shield type is often used for signal transmission as a measure of preventing noise in high-speed signals, and therefore there is a problem in that the thickness of the FFC is increased due to shielding, and flexibility is further deteriorated, and the risk of being broken or caught is increased, compared with a low-speed device.

Also, according to the invention disclosed by Japanese Unexamined Patent Application Publication No. 2010-107825, the risk that the chassis member of the case frame is broken or caught is solved, but there is a problem in that the size of the device is increased in proportion to the volume of the concave portion to be formed.

Accordingly, as a result of conducting various studies, the inventors of the present invention have found that an approach distance for stabilizing the amount of light is required outside image areas in the LED light conductor method, and a space formed for the approach distance is efficiently used as a storage space for the bending portion of the FFC, and that the FFC can be bent with a sufficient space without further increasing the size of the device for the FFC, and the risk that the FFC is broken or caught can be reduced, with regard to the high-speed scanner that necessitates the high-speed signals.

SUMMARY OF THE INVENTION

It is an object of the present invention, based on the aforementioned knowledge, to provide an image reading device and an image forming device, which reduce bending stress applied to an FFC and reduce the risk of deterioration due to the breakage or pressing of the FFC, without increasing the size of a device.

An image reading device of the present invention, which reads an image of a document on platen glass and acquires an image signal, includes a reading unit in which a lighting system for lighting the document and an optical system for forming an image with respect to reflective light of the document lighted by the lighting system are mounted, the reading unit configured to irradiate light to the document and receive the reflective light on the document, thereby reading the image of the document, while transferring in a sub-scanning direction, a controller configured to be provided at a position where the controller does not transfer along with the reading unit, and a flexible flat cable configured to include a curved portion whose part is curved in a U shape and configured to connect the reading unit with the controller. The lighting system is configured to include an elongated light conductor extended in a main scanning direction and an end portion light source arranged at an end portion of the light conductor. Then, the flexible flat cable is arranged on the outside of the optical system and on a lower side of the light conductor.

Regarding the image reading device of the present invention, the curved portion of the flexible flat cable may be arranged on a downstream side at a time of reciprocating in the sub-scanning direction.

The image reading device of the present invention may include a guide configured to prevent the flexible flat cable from drooping on a lower side of the flexible flat cable except for the curved portion.

Regarding the image reading device of the present invention, the flexible flat cable may be arranged at any one of both sides in the main scanning direction, outside an image area where the document is placed.

Regarding the image reading device of the present invention, the flexible flat cable may be arranged on a front side of the device facing a user who operates the image reading device.

Regarding the image reading device of the present invention, the end portion light source is arranged on a front side of the device facing a user who operates the image reading device, and light is irradiated to a back side of the device, which is opposite to the front side of the device.

Regarding the image reading device of the present invention, a distance from the end portion light source of the lighting system to a front of the image area where the document is placed may be set greater than a width of the flexible flat cable.

An image forming device of the present invention includes the image reading device according to any one of claims 1 to 7. Then, the image is formed on recording paper based on the image read by the image reading device.

DESCRIPTION OF THE PREFERRED EMBODIMENTS

Hereinafter, an embodiment in which the present invention of the instant application is embodied will be described with reference to drawings. An image forming device of the present invention has only to include an image reading device, and for example, a copy machine, a printer having a copying function, or a multifunction printer may be applied.

1. Constitution of Image Forming Device

Figure 1:
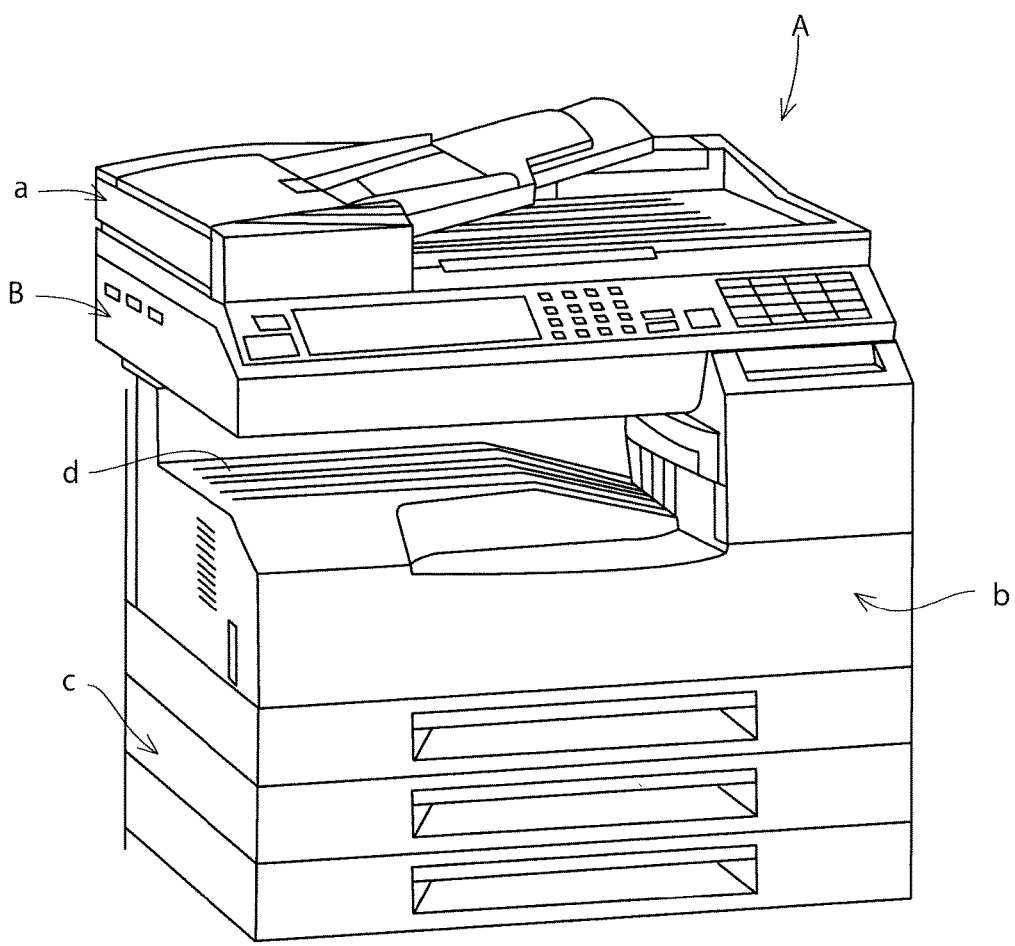
FIG. 1 is a perspective view of an image forming device according to the embodiment of the present invention.

FIG. 1 is a perspective view of an image forming device A according to the present embodiment. As illustrated in FIG. 1, the image forming device A includes an image reading device B that reads images from a document, an automatic document feeder a, a print engine b, a paper cassette c, and a tray d. In the image forming device A, the image reading device B reads the image of the document, and the print engine b forms the image on recording paper fed from the paper cassette c, and the recording paper is discharged on the tray d. Hereinafter, the image reading device, which is characteristic of the present invention, will be described in detail.

2. Image Reading Device

Figure 2:
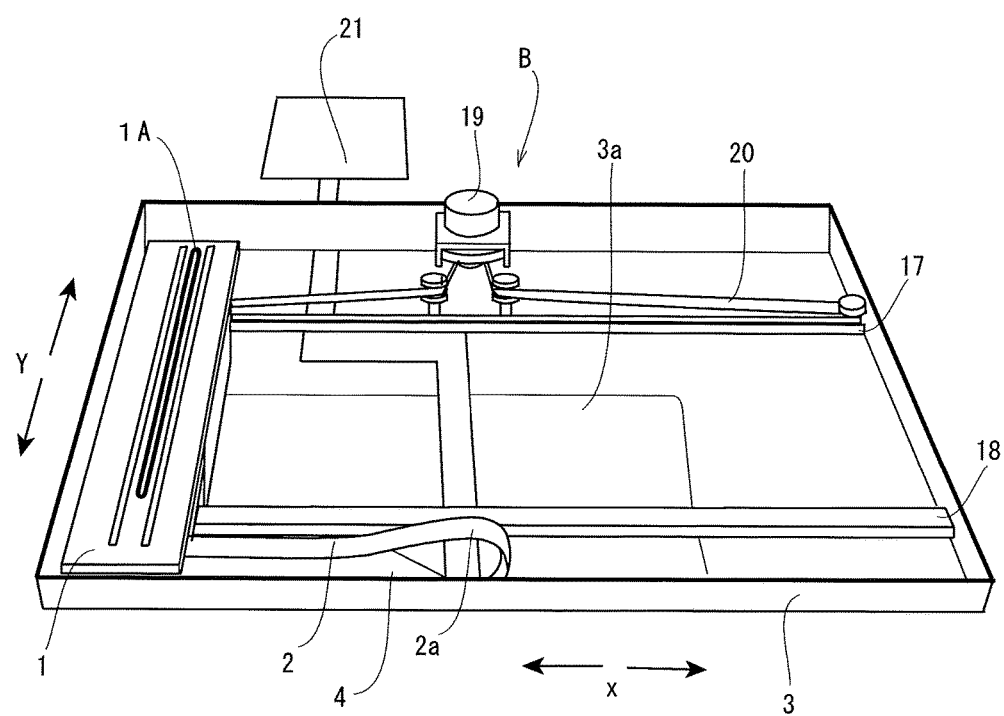
FIG. 2 is a perspective view of an image reading device according to the embodiment of the present invention.
Figure 3:
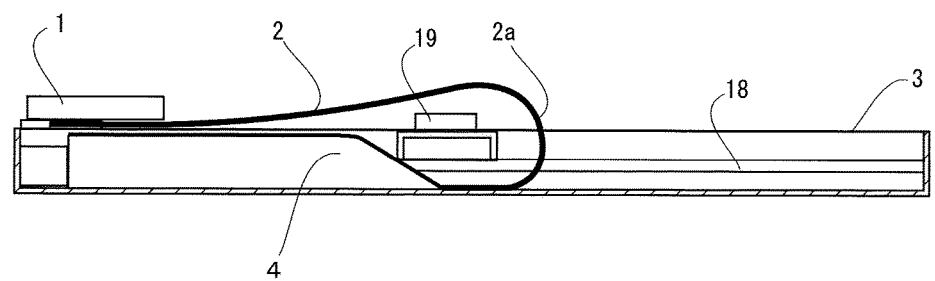
FIG. 3 is a front cross-sectional view of the image reading device according to the embodiment of the present invention.
Figure 4:
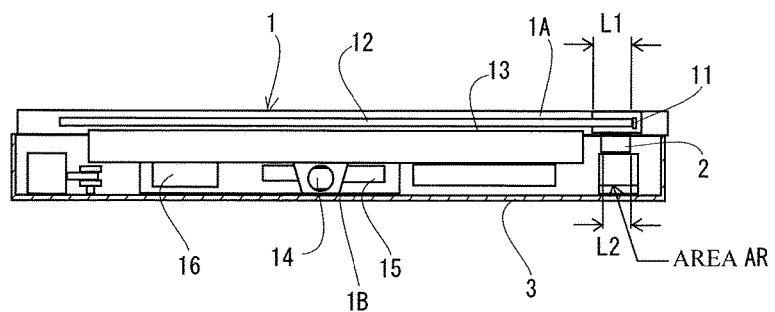
FIG. 4 is a lateral cross-sectional view of the image reading device according to the embodiment of the present invention.
Figure 5:
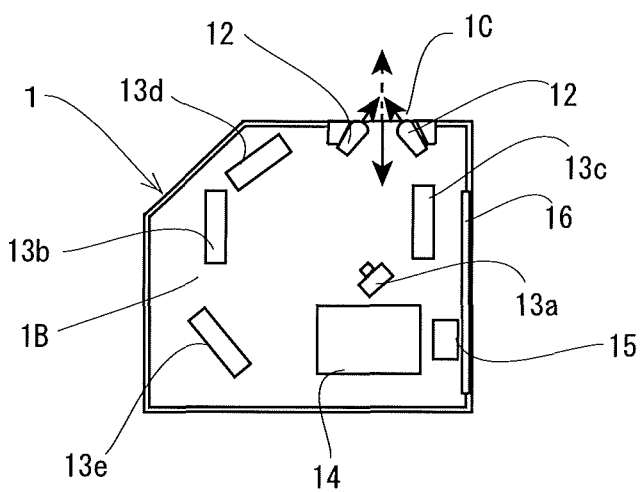
FIG. 5 is a front cross-sectional view of a reading unit of the image reading device according to the embodiment of the present invention.
Figure 6:
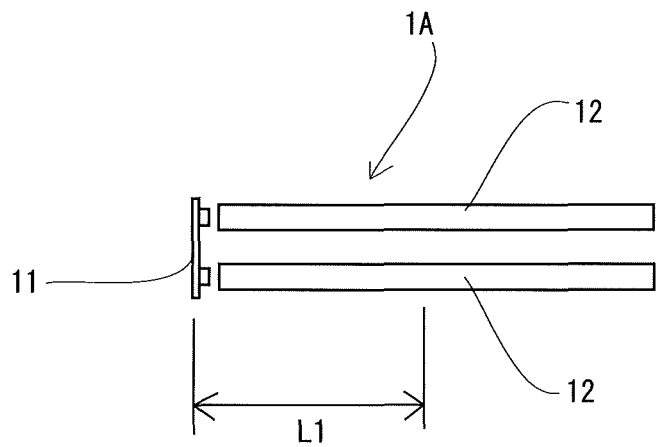
FIG. 6 is a top enlarged view of the reading unit of the image reading device according to the embodiment of the present invention.

The embodiment of the image reading device according to the present invention will be described with reference to FIGS. 2 to 6. FIG. 2 is a perspective view of the image reading device according to the present embodiment. FIG. 3 is a front cross-sectional view of the image reading device according to the present embodiment. FIG. 4 is a lateral cross-sectional view of the image reading device according to the present embodiment. FIG. 5 is a front cross-sectional view of a reading unit of the image reading device according to the present embodiment. FIG. 6 is a top enlarged view of the reading unit of the image reading device according to the present embodiment.

As illustrated in FIG. 2, the image reading device B includes a reading unit 1, an FFC 2, a case frame 3, and platen glass (not illustrated). It is noted that the platen glass is a rectangular transparent plate and mounted on an opening portion on the upper surface side of the case frame 3. The documents are placed on a placement surface, which is the upper surface of the platen glass, in a state where a read surface is oriented to a lower side.

2-1. Case Frame

As illustrated in FIG. 2, the case frame 3 is a container member whose whole body is formed in an approximately rectangular shape, and whose upper side is opened. The short-side direction Y of the case frame 3 is a main scanning direction, and the long-side direction X of the case frame 3 is a sub-scanning direction. It is noted that product specifications such as the height of a product are directly affected by the magnitude and height of the case frame 3, so that the case frame 3 is designed in such a manner as to be reduced in thickness and size as much as possible.

On the case frame 3, rails 17 and 18 that are in parallel to the sub-scanning direction, a motor 19 for reciprocating the reading unit 1, and a belt 20 are provided. The reading unit 1 is slidably provided with respect to the rails 17 and 18 and reciprocatable in the sub-scanning direction.

2-2. Reading Unit

As illustrated in FIG. 4, a lighting system 1A, a CCD light receiving element (imaging device) 15, and an optical system 1B are mounted on the reading unit 1. Also, as illustrated in FIGS. 2 and 5, a slit portion 1C through which illumination light and reflection light pass is formed on the upper surface of the reading unit 1.

As illustrated in FIG. 5, the optical system 1B includes mirrors 13a to 13e and an image forming lens 14 and causes the image forming lens 14 to form an image with respect to the reflective light of the document, which is irradiated by the lighting system 1A, and the CCD light receiving element 15 captures the image. The CCD light receiving element 15 is packaged on a CCD substrate 16, and the CCD substrate 16 and a control substrate (controller) 21 (see FIG. 2) installed on the outside of the case frame 3 are connected with the FFC 2, thereby transmitting signal information therebetween.

As illustrated in FIGS. 4 and 6, the lighting system 1A includes an elongated LED light conductor 12 extended in the main scanning direction and an LED light-emitting element (end portion light source) 11 arranged at the end portion of the LED light conductor 12. The LED light conductor 12 is a rod-shaped member formed of transparent materials such as acryl and polycarbonate and extended in the main scanning direction. In the LED light conductor 12, a light beam incident from the LED light-emitting element 11 is reflected with a member (not illustrated), which has a reflective shape such as a prism and is provided in the LED light conductor 12, and the light beam is irradiated to the document.

It is noted that the LED light-emitting element 11 is arranged in the front of the device in the main scanning direction and configured in such a manner that light is irradiated to the back side of the device. Accordingly, a user can avoid directly viewing the light irradiated from the LED light-emitting element 11. It is noted that, in the present invention, "the front of the device" means a side of the device facing the user who operates the image reading device or the image forming device (a side in the front of the device in FIG. 1).

The reading unit 1 reciprocates in the case frame 3 in the sub-scanning direction X and reads the document. When the reading unit 1 reads the document, the light irradiated from the LED light-emitting element 11 is irradiated to the document with the LED light conductor 12 as a linear light source in the longitudinal direction of the reading unit 1, and the reflective light from the document is sequentially reflected with the mirrors 13a to 13e and reflected toward the image forming lens 14, which forms an image on the CCD light receiving element 15. The CCD light receiving element 15 performs photoelectric conversion in accordance with the intensity of incident light for each pixel, thereby generating image signals (RGB signals) corresponding to the image of the document and outputting the image signals to a control substrate 21.

The reading unit 1 performs a series of operations described above while transferring in the sub-scanning direction X of the case frame 3, thereby obtaining two-dimensional read images. Also, when the reading unit 1 transfers, the FFC 2 is bent during the transfer.

2-3. FFC

The FFC 2 includes a curved portion 2a of which the part is curved in a U shape on a downstream side in reciprocating in the sub-scanning direction X, extends from the reading unit 1 to the downstream side in reciprocating in the sub-scanning direction X, and connects the reading unit 1 with the control substrate 21. As for route in arranging the FFC 2, the left side of FIG. 2 in the longitudinal direction of the case frame 3 is regarded as a home position at the start of scanning, and the FFC 2 is horizontally extended in the sub-scanning direction X at the home position from the reading unit 1 and curved in a U shape on the downstream side in reciprocating in the sub-scanning direction X, thereby forming the curved portion 2a.

2-4. Guide

A guide 4 for preventing the FFC 2 from drooping is provided on the lower side of FFC 2 except for the curved portion 2a, on the downstream side of the FFC 2 on the bottom surface portion 3a of the case frame 3. That is, there is a possibility that the FFC 2 droops due to the exposure to a high temperature or heat cycles in half of the area on the upstream side in scanning in the sub-scanning direction X, and therefore the guide 4 is provided in the lower side area (an area AR in FIG. 4) of the LED light-emitting element, thereby preventing the FFC 2 from being caught, which is attributed to the drooping of the FFC 2.

3. Characteristic of Arrangement of FFC

As for the linear light source made up of the LED light-emitting element 11 and the LED light conductor 12 of the lighting system 1A, the LED light-emitting element 11 is arranged at the end portion of the LED light conductor 12 so as to provide the linear light source, so that the length of the lighting system in the main scanning direction is inevitably longer than an irradiation area to be required. Also, in view of the characteristics of the LED light conductor 12, it is necessary to secure an approach distance to some extent so as to stabilize the luminance characteristics of the area required, so that the lighting system becomes longer. Accordingly, as illustrated in FIGS. 4 and 6, when it is assumed that a distance from the LED light-emitting element 11 to front of the image area is "L1", an empty space in which the optical system 1B does not exist can be formed at least on the lower side of the approach portion of the LED light conductor 12 and the LED light-emitting element 11, so that the empty space can be utilized as a storage space for the FFC 2.

Consequently, the bending stress applied to the FFC is reduced without increasing the size of the device, so that the risk that the FFC is broken or caught can be solved.

3-1. Regarding Height of Empty Space

In recent years, along with an increase in reading speed, signals transmitted from the CCD substrate 16 are often of high-speed signals of the order of GHz, and therefore a shielding layer is provided in the FFC 2 as a countermeasure for irradiation noise, and an impedance adjusting layer for maintaining quality of transmission is often provided. As is often the case with its constitution, the FFC 2 is hard to be bent, compared with normal cables, so that the curvature radius of the curved portion of the FFC 2 tends to be increased.

In contrast, in the case of the lighting system 1A in which the LED light conductor 12 is used, the direction of the light from the LED light-emitting element 11 is changed in the LED light conductor 12, and the light is irradiated to the document. However, when the light is irradiated to the document, the irradiation angle of the LED is not exactly at 90 degrees with respect to the document, and the rate of the light irradiated in an oblique direction is increased. Accordingly, the LED light-emitting element 11 and the LED light conductor 12 are arranged near to the document as much as possible, which makes it possible to store the FFC 2 of which the curved portion 2a has large radius curvature and reduce the bending stress applied to the FFC 2, which is caused by the bending of the FFC 2. In particular, the stress applied to the FFC 2 can be alleviated at the home position of the reading unit 1, so that load on the FFC 2 can be efficiently reduced.

3-2. Regarding Width of Empty Space

As illustrated in FIG. 4, the width of the FFC 2 is regarded as "L2", and a horizontal distance L1 ranging from the LED light-emitting element 11 to front of the image area is set longer than the L2, which makes it possible to arrange the FFC 2 in the area AR and stabilize the light distribution of the LED. The area AR is the approach distance (approach area) for stabilizing the illuminance of the LED and basically disposed outside the necessary image area, and therefore the FFC 2 is arranged in the area AR. For example, even when the FFC 2 and the platen glass contact each other and soil the glass at a time of scanning, the FFC 2 has little influence on images because the contact is made outside the necessary image area.

3-3. Summary

Thus, the empty space is efficiently utilized as the storage area of the curved portion 2a of the FFC 2, so that the FFC can be bent with a sufficient space without increasing the size of the device for the FFC, and in particular, the risk that the FFC is broken or caught can be reduced, with regard to the high-speed scanner that necessitates the high-speed signals.

Also, in view of a trend to the use of the LED light conductor 12 so as to enhance the efficiency of LEDs, a trend to the use of scanning modules so as to miniaturize CCD, and tendency in which the market is selecting the use of the shield FFC in view of accelerating, demands for the miniaturization of the device have been always high, so that the device of the present invention can satisfy these requirements.

The aforementioned embodiment has been exemplified by the multifunction printer as the image forming device in which the image reading device is provided, but not limited to this. The present invention can be applied to the image forming device such as a facsimile machine.

The invention claimed is:

1. An image reading device configured to read an image of a document on platen glass and acquire an image signal, comprising:
   a reading unit in which a lighting system for lighting the document and an optical system for forming an image with respect to reflective light of the document lighted by the lighting system are mounted, the reading unit configured to irradiate light to the document and receive the reflective light on the document, thereby reading the image of the document, while transferring in a sub-scanning direction;
   a controller configured to be provided at a position where the controller does not transfer along with the reading unit; and
   a flexible flat cable configured to include a curved portion whose part is curved in a U shape and configured to connect the reading unit with the controller,
   wherein the lighting system is configured to include an elongated light conductor extended in a main scanning direction and an end portion light source arranged at an end portion of the light conductor,
   wherein the flexible flat cable is arranged on a lower side of the light conductor and on a side of the light conductor where the end portion light source is arranged; and
   wherein the flexible flat cable is arranged from an end of the light conductor within an approach distance for stabilizing the luminance characteristics of the lighting system.

2. The image reading device according to claim 1, wherein the curved portion of the flexible flat cable is arranged on a downstream side at a time of reciprocating in the sub-scanning direction.

3. The image reading device according to claim 2, further comprising a guide configured to prevent the flexible flat cable from drooping on a lower side of the flexible flat cable except for the curved portion.

4. The image reading device according to claim 1, wherein the flexible flat cable is arranged at any one of both sides in the main scanning direction, outside an image area where scanning is carried out.

5. The image reading device according to claim 4, wherein the flexible flat cable is arranged on a front side of the device facing a user who operates the image reading device.

6. The image reading device according to claim 1, wherein the end portion light source is arranged on a front side of the device facing a user who operates the image reading device, and light is irradiated to a back side of the device, which is opposite to the front side of the device.

7. The image reading device according to claim 1, wherein a distance from the end portion light source of the lighting system to a front of the image area where the document is placed is set greater than a width of the flexible flat cable.

8. An image forming device comprising:
the image reading device according to claim 1,
wherein the image is formed on recording paper based on the image read by the image reading device.

* * * * *